(12) United States Patent
Rauscher et al.

(10) Patent No.: US 11,271,461 B2
(45) Date of Patent: Mar. 8, 2022

(54) METHOD AND DEVICE FOR INSERTING WIRES

(71) Applicant: GROB-WERKE GmbH & Co. KG, Mindelheim (DE)

(72) Inventors: Ralf Rauscher, Fellheim (DE); Tobias Haggenmueller, Unterthingau (DE)

(73) Assignee: GROB-WERKE GmbH & Co. KG, Mindelheim (DE)

( * ) Notice: Subject to any disclaimer, the term of this patent is extended or adjusted under 35 U.S.C. 154(b) by 261 days.

(21) Appl. No.: 16/320,957

(22) PCT Filed: Jul. 27, 2017

(86) PCT No.: PCT/EP2017/069097
§ 371 (c)(1),
(2) Date: Jan. 25, 2019

(87) PCT Pub. No.: WO2018/019970
PCT Pub. Date: Feb. 1, 2018

(65) Prior Publication Data
US 2019/0165657 A1    May 30, 2019

(30) Foreign Application Priority Data
Jul. 27, 2016   (DE) .................... 10 2016 113 894.0

(51) Int. Cl.
H02K 15/06   (2006.01)
H02K 15/04   (2006.01)

(52) U.S. Cl.
CPC ....... H02K 15/066 (2013.01); H02K 15/0478 (2013.01)

(58) Field of Classification Search
CPC .................... H02K 15/066; H02K 15/0478
See application file for complete search history.

(56) References Cited

U.S. PATENT DOCUMENTS

| 3,467,148 A | 9/1969 | Brown, Jr. | |
| 3,815,206 A * | 6/1974 | Smith | H02K 15/068 29/606 |
| 4,477,966 A * | 10/1984 | Napierski | H02K 15/068 29/596 |
| 6,229,241 B1 | 5/2001 | Ishigami et al. | |

(Continued)

FOREIGN PATENT DOCUMENTS

| CN | 1738162 A | 2/2006 |
| CN | 101371422 A | 2/2009 |

(Continued)

OTHER PUBLICATIONS

An Office Action mailed by China National Intellectual Property Administration dated Jun. 30, 2020, which corresponds to Chinese Patent Application No. 201780059435.5 and is related to U.S. Appl. No. 16/320,957 with English language translation.

(Continued)

*Primary Examiner* — Minh N Trinh
(74) *Attorney, Agent, or Firm* — Studebaker & Brackett PC

(57) ABSTRACT

A method and to a device for inserting a plurality of wires into a plurality of grooves of a component, such as a stator or rotor of an electric motor, in which the wires are inserted by gripping elements.

12 Claims, 16 Drawing Sheets

(56) References Cited

U.S. PATENT DOCUMENTS

| | | | |
|---|---|---|---|
| 6,601,288 B2* | 8/2003 | Becherucci | H02K 15/0062 |
| | | | 29/596 |
| 10,396,638 B2* | 8/2019 | Noji | H02K 15/066 |
| 2005/0218746 A1 | 10/2005 | Fukasaku et al. | |
| 2009/0260218 A1 | 10/2009 | Akimoto et al. | |
| 2014/0201979 A1* | 7/2014 | Yamaguchi | H02K 15/065 |
| | | | 29/596 |
| 2014/0215806 A1* | 8/2014 | Yamaguchi | H02K 15/065 |
| | | | 29/596 |
| 2019/0165657 A1* | 5/2019 | Rauscher | H02K 15/0478 |

FOREIGN PATENT DOCUMENTS

| | | |
|---|---|---|
| CN | 103765739 A | 4/2014 |
| DE | 20 01 677 A1 | 7/1970 |
| DE | 43 01 234 A1 | 8/1993 |
| DE | 198 24 920 A1 | 12/1999 |
| DE | 103 28 955 A1 | 2/2005 |
| JP | S56-19363 A | 2/1981 |
| JP | 2009-005434 A | 1/2009 |

OTHER PUBLICATIONS

International Search Report issued in PCT/EP2017/069097; dated Oct. 24, 2017.
Written Opinion issued in PCT/EP2017/069097; dated Oct. 24, 2017.
German Search Report issued in DE 10 2016 113 894.0; completed by the German Patent and Trademark Office dated May 4, 2017.
Jurgen Hagedorn et al.; "Manual of Winding Technology for Highly Efficient Coils and Motors"; A Contribution to Energy Efficiency; 2016; pp. 286-290; ISBN 978-3-662-49209-3; Springer Vieweg.

* cited by examiner

… …

METHOD AND DEVICE FOR INSERTING WIRES

CROSS-REFERENCE TO RELATED APPLICATIONS

This application is a National Stage of International Patent Application No. PCT/EP2017/069097, filed Jul. 27, 2017, which claims benefit from DE 10 2016 113 894.0, filed Jul. 27, 2016, the entire content of each are incorporated herein by reference.

BACKGROUND

Technical Field

The disclosure relates to a method and device for inserting a plurality of wires into a plurality of grooves of a component. The component may be, in particular, a stator or a rotor of an electric motor.

Background Art

In the near future, components such as stators and rotors of an electric motor will be manufactured in much larger quantities than before, especially in the power class required to drive electric vehicles. This is due in particular to the increasing prevalence of electro-mobility.

SUMMARY

Accordingly, it is desirable to develop novel and, for example, more efficient production methods and related devices with which components of electric motors can be manufactured.

According to the present disclosure, this is achieved by a method and by a device as defined in the corresponding main claims of this application. Advantageous designs are, for example, stated in the respective subclaims.

The disclosure concerns a method for inserting a plurality of wires into a plurality of grooves of a component, in particular a stator or a rotor, of an electric motor, the component having a longitudinal axis, the method comprising the following steps:

providing the wires radially offset to the component so that the wires at least partially extend along the longitudinal axis, gripping the wires at their respective first axial ends by means of number of first gripping elements and at their respective second axial ends opposite said first axial ends by means of a number of second gripping elements, and radially moving the gripping elements and thereby pressing the wires into the grooves.

By means of the inventive method a fast and efficient insertion of the wires into the component is possible.

The component may be, in particular, a stator or a rotor. Such components are preferably used in electric motors. Typically, the component is at least predominantly rotationally symmetrical about the longitudinal axis. In particular, the grooves may be distributed along a circumference. In particular, the grooves may extend in the longitudinal direction and may be open at their longitudinal ends. In this manner, the grooves are also laterally accessible.

The wires may in particular be the wires of a winding of an electric motor. Such a winding can be performed, for example, as a wave winding or a lap winding. In particular, several wires can be used, which are assigned to different phases of the electric motor.

The gripping elements may in particular be in the form of bars or other elements which may extend in particular at least partially in the direction of the longitudinal axis, preferably with a section engaging the wires.

In particular, a first gripping element and a second gripping element may be provided for each groove. In particular, it may be provided that the first gripping elements are located to the left of the wires and/or the component when viewed from a specific direction transverse to the longitudinal direction and that the second gripping elements are located to the corresponding right of the wires and/or the component. This is also possible vice versa.

According to one embodiment it is provided that the wires are arranged axially offset to the component before providing them, and the component and the wires are axially displaced relative to one another so that the component and the wires are aligned with one another in order to provide them.

In this case, the component can be displaced, for example, the wires can be displaced or both the component and the wires can be displaced.

According to one embodiment, it is provided that the wires are compressed before they are provided. This allows the wires to be compacted to such an extent that they fit into the grooves or that more wires fit into a respective groove.

According to one embodiment, the wires are compressed by means of a radial engine. In particular, this is a tool that acts radially from the outside and/or surrounds the wires radially from the outside and that can compress the wires radially inwards in particular. However, the reverse radial direction is also possible.

According to one embodiment, the wires are compressed by means of the first gripping elements and the second gripping elements. This means that the existing gripping elements can also be used for compressing. This can be done in addition or also alternatively to compression by means of a radial engine.

According to one embodiment, the wires are compressed by means of a radial engine, the first gripping elements and the second gripping elements. This corresponds to a hybrid solution of the two techniques described above.

According to one embodiment, the gripping elements grip the wires on one radial side of the wires for compression, which is opposite to the side on which the gripping elements grip the wires for pressing the wires into the grooves. This allows optimum gripping to be achieved.

According to one embodiment, the gripping elements are moved axially away from the wires between the compression and the pressing of the wires into the grooves in order to change the respective radial side. This prevents damage to the wires.

According to one embodiment, the wires are compressed radially inwards. According to one embodiment, the wires are compressed radially outwards. Preferably, the compression is carried out in the opposite direction to the insertion. In particular, the compression can be carried out in a direction away from the grooves.

According to one embodiment, the wires are pressed onto or between a number of guide plates. In particular, the guide plates can be used to hold or stabilize the wires in the circumferential direction.

The guide plates can in particular be radially movable. Preferably, the guide plates are moved away from the grooves when the wires are pressed into the grooves. In particular, in this case, the guide plates are also moved in a direction opposite to the wires.

Preferably, the component is held by the first gripping elements, at least initially. In particular, the first gripping elements can engage radially into the grooves to hold the component. Preferably, the component is axially movable relative to the wires by means of the first gripping elements. Accordingly, the first gripping elements can perform a further function, namely the function of holding the component.

According to a further development, the wires are inserted obliquely to the axis into the grooves. This can prevent canting.

According to one embodiment, the wires are inserted obliquely to the axis into the grooves by radially moving the first gripping elements earlier and/or faster than the second gripping elements or radially moving the second gripping elements earlier and/or faster than the first gripping elements.

According to one embodiment, the gripping elements are moved radially inwards to press the wires into the grooves. This may be applied in particular where the grooves face outwards, for example in a rotor.

According to one embodiment, the gripping elements are moved radially outwards to press the wires into the grooves. This may be applied in particular where the grooves face inwards, for example in a stator.

In particular, the wires can be moved towards the grooves during insertion.

According to a further development, the grooves are finally closed with at least one sliding cover. This allows the wires to be protected in an advantageous manner.

It can also be provided that an insulating film is inserted in the respective groove and/or in all the grooves before the wires are inserted.

The disclosure also relates to a device for inserting a plurality of wires into a plurality of grooves of a component, in particular a stator or a rotor, of an electric motor, the component having a longitudinal axis, the device comprising:

a number of first gripping elements for gripping the wires at their respective first axial ends and a number of second gripping elements for gripping the wires at their respective second axial ends opposite said first axial ends when the wires are provided radially offset to the component, and wherein the gripping elements are designed to move radially and thereby press the wires into the grooves.

The device is particularly suitable or designed for carrying out a method according to the disclosure. With regard to the method, all the embodiments and variants described can be used.

The following device features are similar to the above-described method features. The detailed description thereof will not be repeated unless deemed necessary. Reference is made to the above description of the method features, which correspondingly applies to the device features.

According to one embodiment, the wires can be arranged axially offset to the component before the wires are provided, and the component and the wires can be axially displaced relative to each other in order to provide the component and the wires so that the component and the wires are axially aligned with each other.

According to one embodiment, the device is designed for compressing the wires before the wires are provided.

According to one embodiment, the device includes a radial engine for compressing the wires.

According to one embodiment, the first gripping elements and the second gripping elements are designed for compressing the wires.

According to one embodiment, the device includes a radial engine for compressing the wires, and the first gripping elements and the second gripping elements are designed for compressing the wires.

According to one embodiment, for compressing the wires, the gripping elements are designed to grip the wires on a radial side of the wires which is opposite to the side on which the gripping elements grip the wires for pressing the wires into the grooves.

According to one embodiment, the gripping elements are designed to be moved axially away from the grooves between compressing and pressing the wires into the grooves in order to change the respective radial side.

According to one embodiment, the device is designed for compressing the wires radially inwards.

According to one embodiment, the device is designed for compressing the wires radially outwards.

According to one embodiment, the device includes a number of guide plates, with the wires being pressed onto or between the guide plates during compression.

According to one embodiment, the guide plates are radially movable.

According to one embodiment, the device is designed for moving the guide plates away from the grooves when the wires are pressed into the grooves.

According to one embodiment, the first gripping elements are designed for holding the component, at least initially.

According to one embodiment, the first gripping elements are designed for engaging radially into the grooves to hold the component.

According to one embodiment, the component is movable axially relative to the wires by means of the first gripping elements.

According to one embodiment, the wires are inserted obliquely to the axis into the grooves.

According to one embodiment, the wires are inserted obliquely to the axis into the grooves by radially moving the first gripping elements earlier and/or faster than the second gripping elements or radially moving the second gripping elements earlier and/or faster than the first gripping elements.

According to one embodiment, the gripping elements are moved radially inwards to press the wires into the grooves.

According to one embodiment, the gripping elements are moved radially outwards to press the wires into the grooves.

According to one embodiment, the device includes means for the finally closing of the grooves, each with at least one sliding cover.

In this context, it is pointed out in particular that all features and characteristics described in relation to the device, but also procedures or techniques, are also considered to be transferable analogously in relation to the formulation of the method according to the disclosure and applicable in the sense of the disclosure and disclosed as well. The same also applies vice versa, i.e. features mentioned only in relation to the method, hence features relating to the construction of the device, can also be considered and claimed within the scope of the device claims and are also part of the disclosure.

BRIEF DESCRIPTION OF THE DRAWINGS

One embodiment of the disclosure is schematically represented in the attached drawing wherein.

DETAILED DESCRIPTION

In the Figures, identical or corresponding elements are each designated with the same reference signs. The detailed description thereof will not be repeated unless it appears necessary. The disclosures throughout the description are transferable analogously to identical elements with identical reference signs or with the same component designation. Also, positional information in the description, such as top, bottom, lateral etc., is related to the Figure directly described and illustrated and is to be transferred accordingly to the new position in case of a position change.

In addition, individual features or combinations of features from the different embodiments shown and described may represent independent inventive solutions or solutions according to the disclosure.

Figure 1:
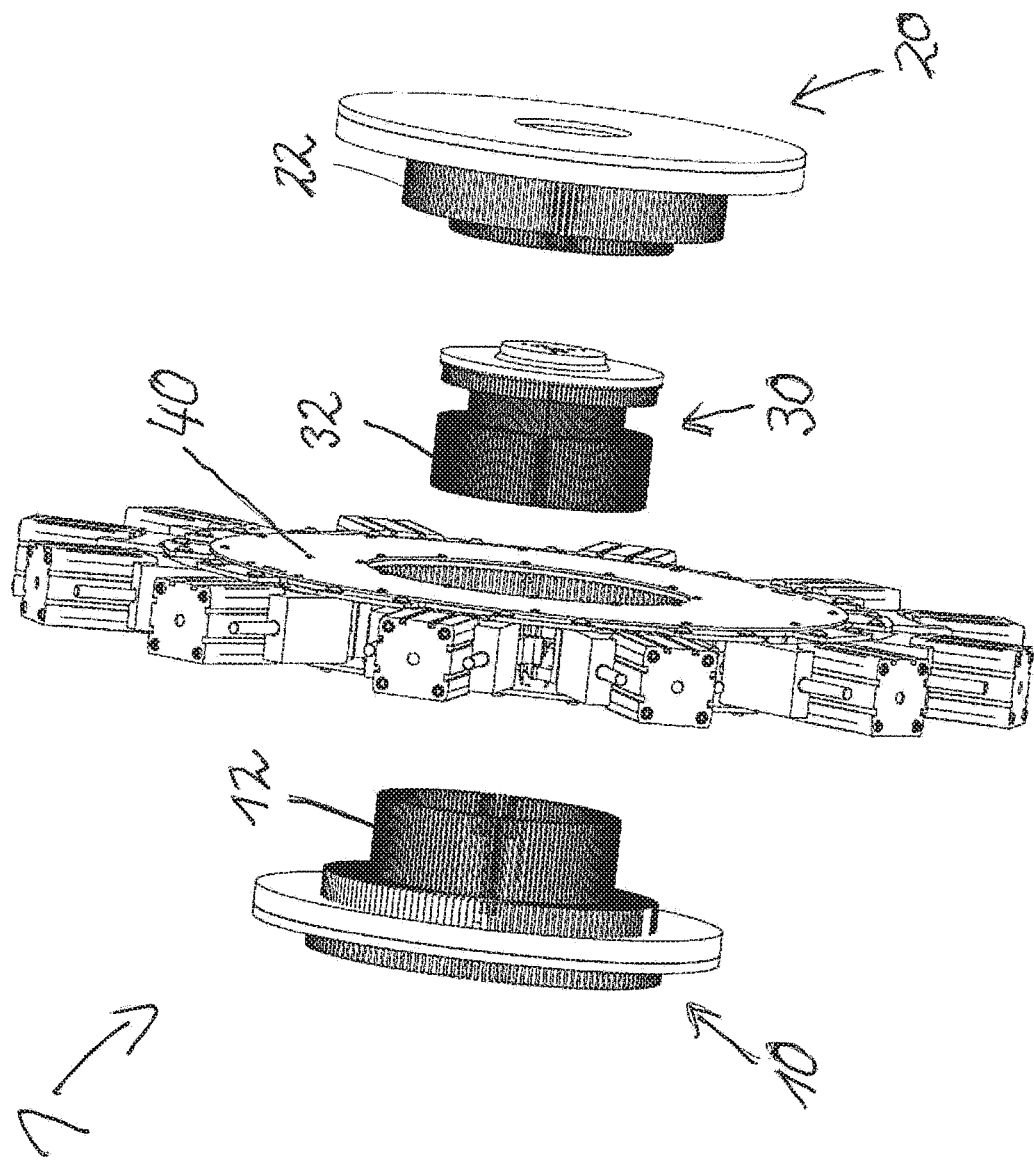
FIGS. 1 to 8 show states in a method according to a first embodiment.

FIG. 1 shows one embodiment of a device 1 of the disclosure for carrying out a method according to one embodiment of the disclosure. The device 1 includes a first gripping unit 10 having a number of first gripping elements 12, and a second gripping unit 20 having a number of second gripping elements 22. As illustrated, each of the gripping elements 12, 22 faces inwards. Between the gripping units 10, 20 a joining tool 30 is arranged. On this joining tool a number of guide plates 32 are fixed.

The device 1 further includes a radial engine 40, which is also disposed between the gripping units 10, 20. The gripping units 10, 20, the joining tool 30 and the radial engine 40 are all essentially radially symmetrically designed and are disposed along a longitudinal axis (not shown), with the gripping units 10, 20 being arranged on the outside as mentioned.

Figure 2:
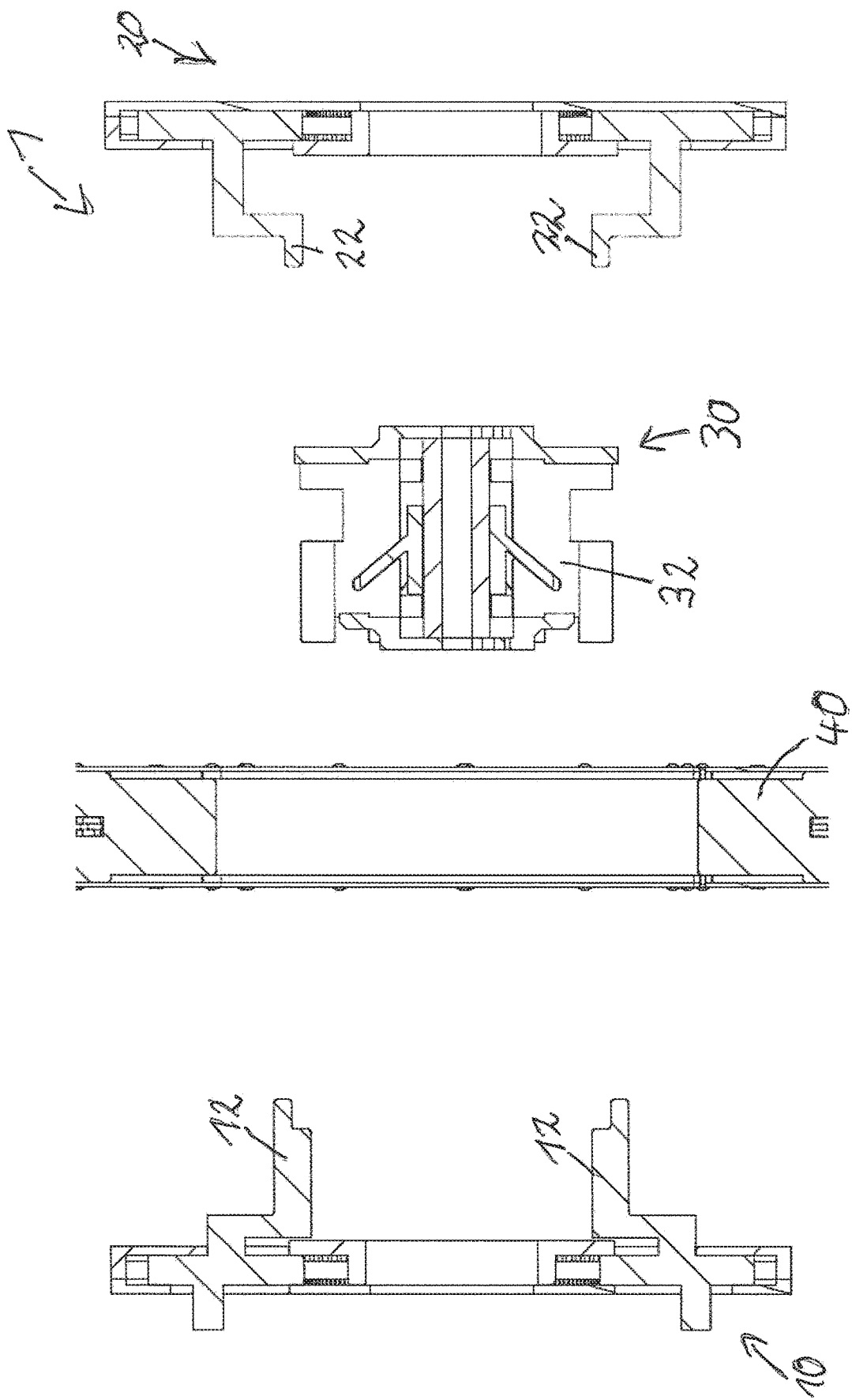

FIG. 2 shows the device 1 in a sectional side view. It can be seen, in particular, that a respective gripping element 12, 22 is designed as an inward projection. The gripping elements 12, 22 are designed to be moveable radially as discussed in more detail below.

Figure 3:
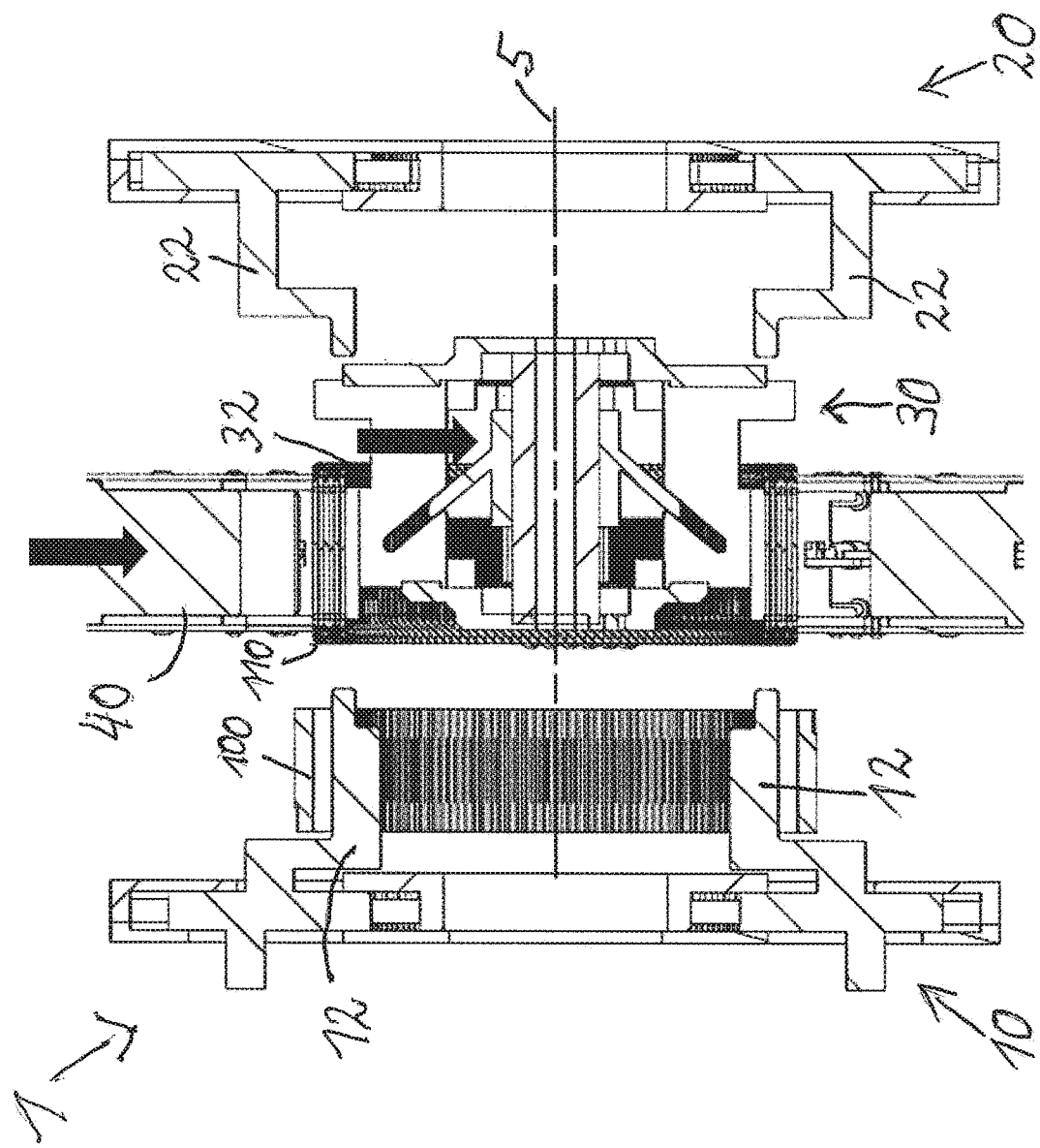

FIG. 3 shows the device 1 in a state where the above-mentioned components are closer to each other than it is the case in the FIGS. 1 and 2. FIG. 3 shows the already mentioned longitudinal axis 5. It is understood that expressions like "radially" or "axially" typically refer to this longitudinal axis 5.

FIG. 3 further shows a component 100 in the form of a stator for an electric motor, and wires 110. The wires 110 are designed as a wire pack. The component 100 is held by the first gripping elements 12 as shown.

The wires 110 will be inserted into grooves of the component 100 by means of one embodiment of the method according to the disclosure. The following describes how this is done.

In the state shown in FIG. 3, the component 100 and the wires 110 are still arranged axially offset to each other. The wires 110 are first compressed. This is performed by means of the radial engine 40 having a number of radially movable elements not further illustrated. The compressing action is represented by means of the arrow plotted radially outside in FIG. 3.

Figure 4:
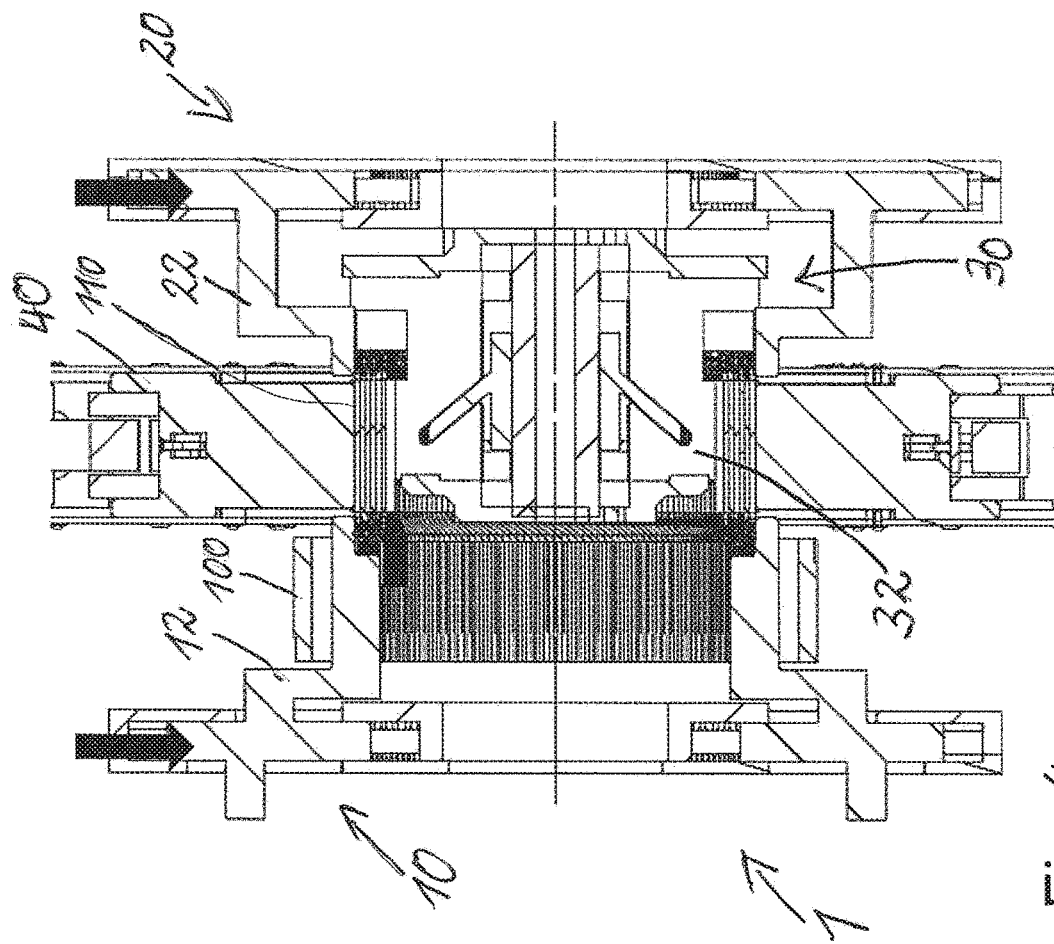

FIG. 4 shows a later state in the method. The first gripping elements 12 and the second gripping elements 22 are moved radially inwards as represented by the two arrows in FIG. 4. This serves to hold the wires 110 radially on the outside and to press the wires inwards. This allows retraction of the radial engine because the gripping elements 12, 22 ultimately perform a holding function. Gripping takes place at two axial ends of the wires 110.

It should be noted that, in particular, it is also possible to use both the radial engine 40 and the gripping elements 12, 22 for compressing the wires. This corresponds to a hybrid design.

In the state the wires 110 assume in the FIGS. 3 and 4, the wires are located between the guide plates 32. The guide plates 32 can also be moved radially as described in more detail below.

Figure 5:
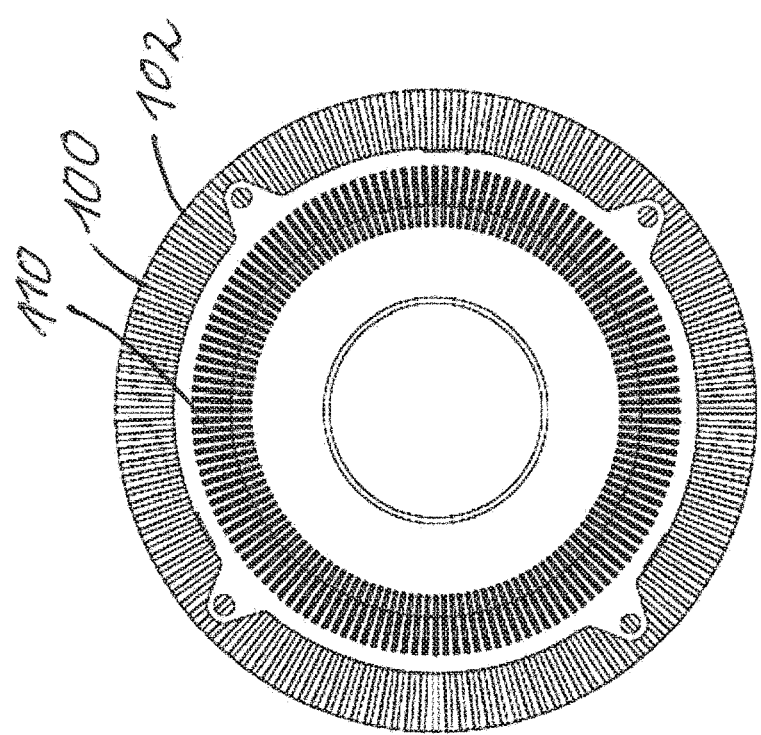

FIG. 5 shows the component 100 and the wires 110 separately in a side view. It can be seen that the component has a number of grooves 102 which have already been mentioned above. The wires 110 are to be inserted into these grooves.

It should be noted that in the present case each groove 102 is assigned exactly one first gripping element 12 and one second gripping element 22.

Figure 6:
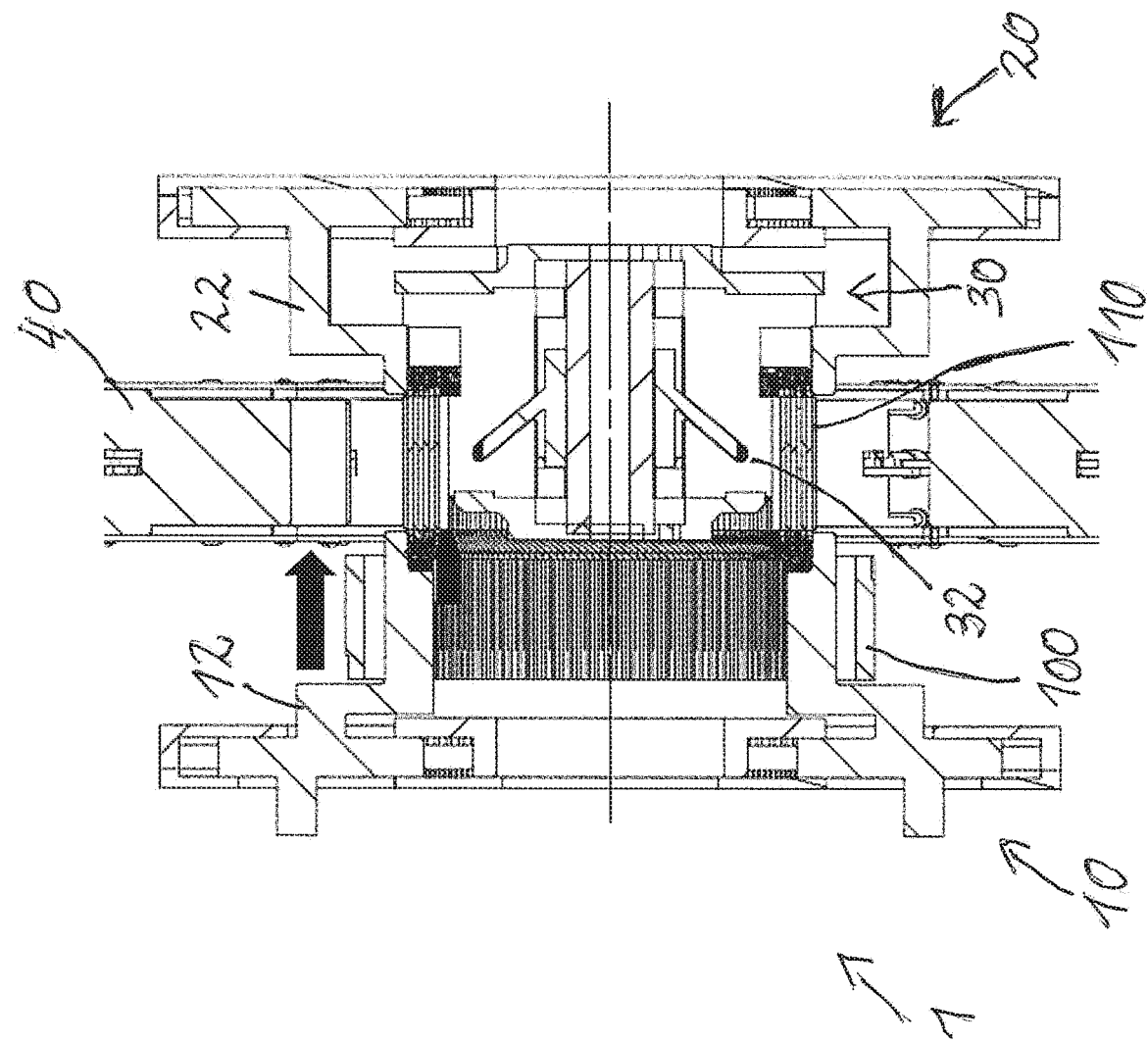

FIG. 6 shows the same state as FIG. 4, but an arrow in FIG. 6 indicates that the component 100 is now being displaced axially to the right.

Figure 7:
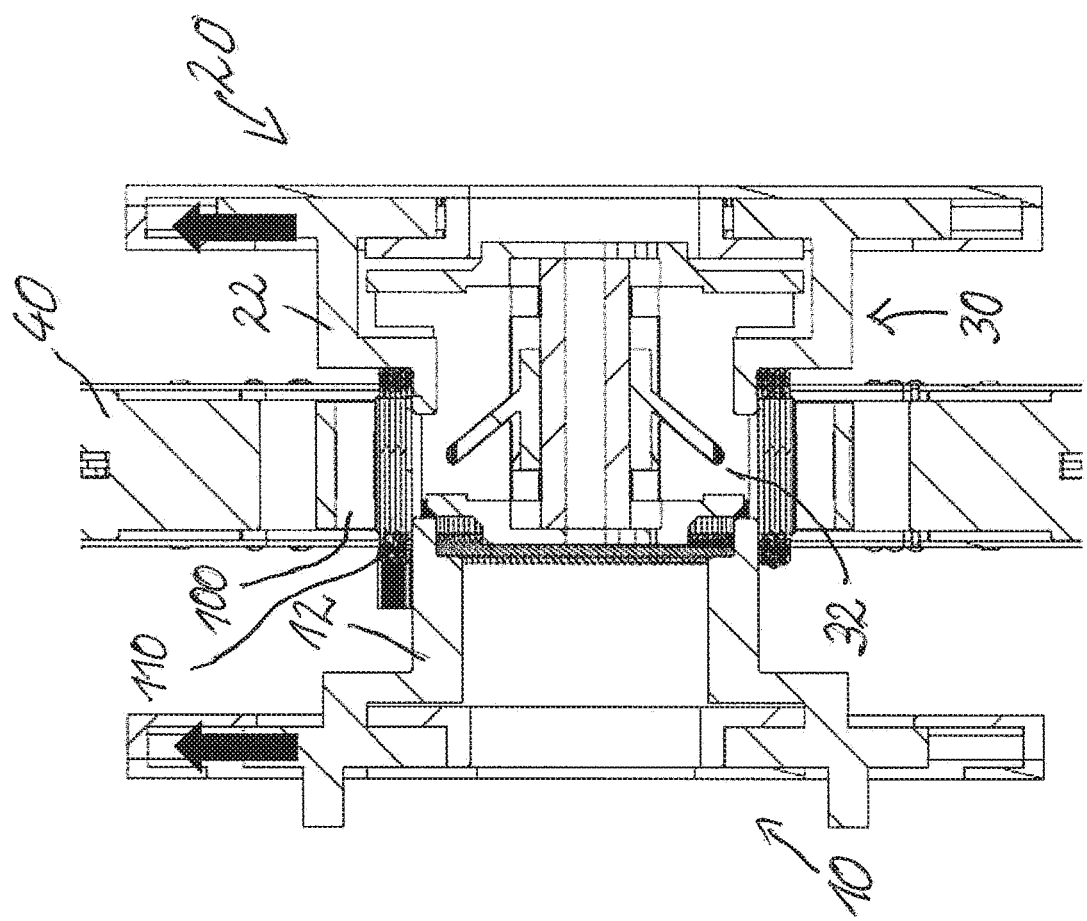

The resulting state is shown in FIG. 7. In this state, the wires 110 are provided ready for insertion into the grooves 102 of the component 100. The wires 110 are axially offset, in the present case axially inwardly with respect to the component 100.

In contrast to the state of FIG. 6, in the state of FIG. 7 the gripping elements do not engage the wires radially on the outside, but radially on the inside. To this end, they have initially been pulled away axially outwards between the two states shown in the FIGS. 6 and 7, then offset radially inwards and then again pushed axially towards each other.

Starting from the state shown in FIG. 7, the wires 110 are now inserted into the grooves 102 of the component 100. To this end, the gripping elements 12, 22 are moved radially outwards as represented by the two arrows in FIG. 7. The wires 110 are moved radially outwards and thereby inserted into the grooves 102. During this operation, the guide plates 32 are moved radially inwards.

Figure 8:
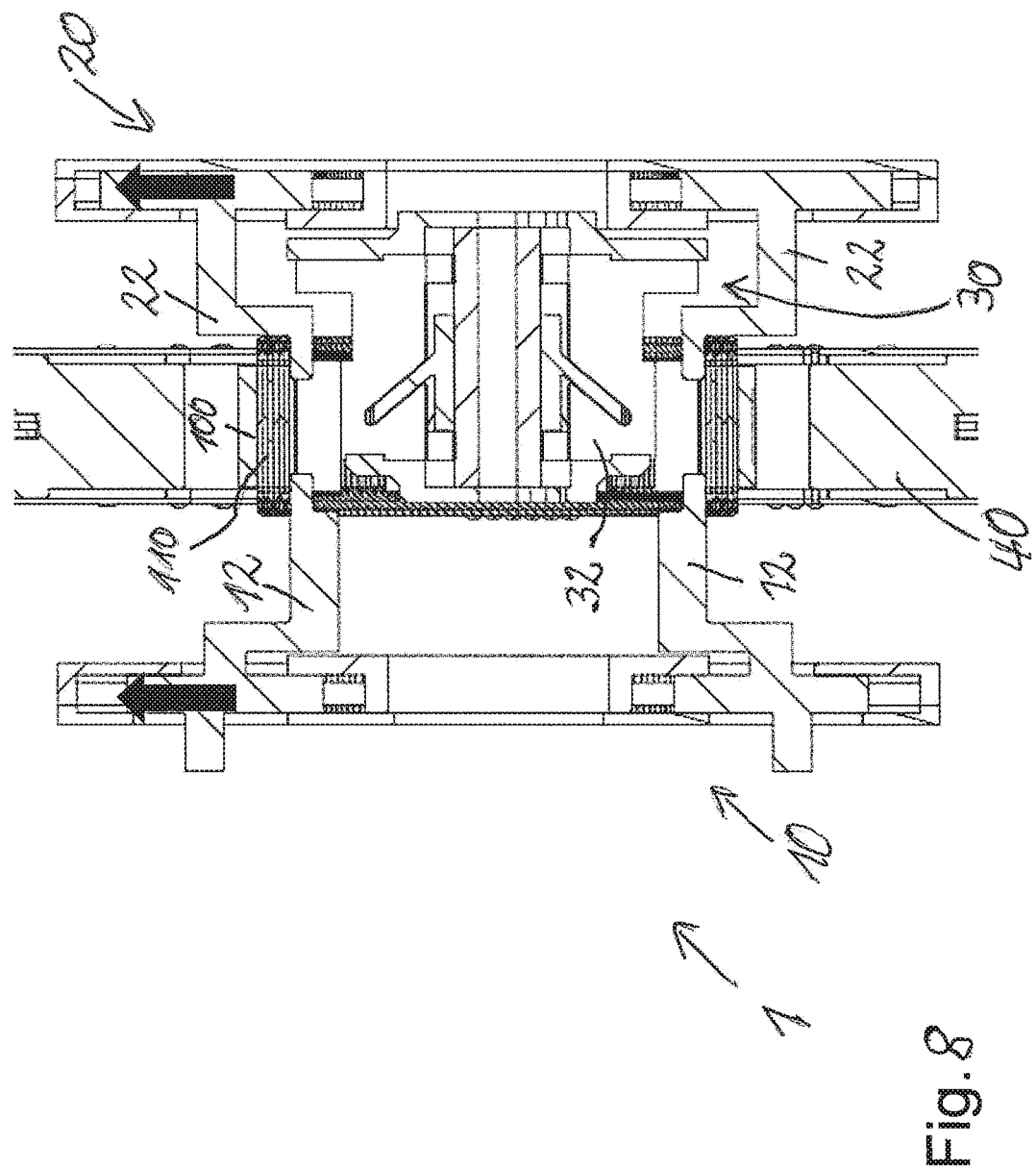

FIG. 8 shows a state where the wires 110 are completely inserted into the stator 100. It can be seen that the gripping elements 12, 22 are radially further outward than in the state of FIG. 7.

It should be mentioned that the wires can also be obliquely inserted by moving the first gripping elements 12 radially outwards earlier and/or faster than the second gripping elements 22 or vice versa. This avoids canting of the wires 110 during insertion.

Further, it is also understood that it is generally possible to carry out the method in such a way that the wires 110 are inserted into radially outwardly opened grooves from radially outwards. This essentially requires that the radial directions of movement of the gripping elements 12, 22 be reversed.

The FIGS. 9 to 17 show a method according to a second embodiment of the present disclosure.

In this case, the device 1 is designed slightly differently, namely in accordance with a second embodiment of the disclosure. On the one hand, this concerns the exact appearance of the components of the device 1, on the other hand the fact that no radial engine 40 is used in the process according to the second embodiment.

In the following, the FIGS. 9 to 17 will only be described in abbreviated form. Insofar as elements or steps of the method are not explicitly dealt with, reference is made to the corresponding description of the FIGS. 1 to 8, and the same reference signs are used.

Figure 9:
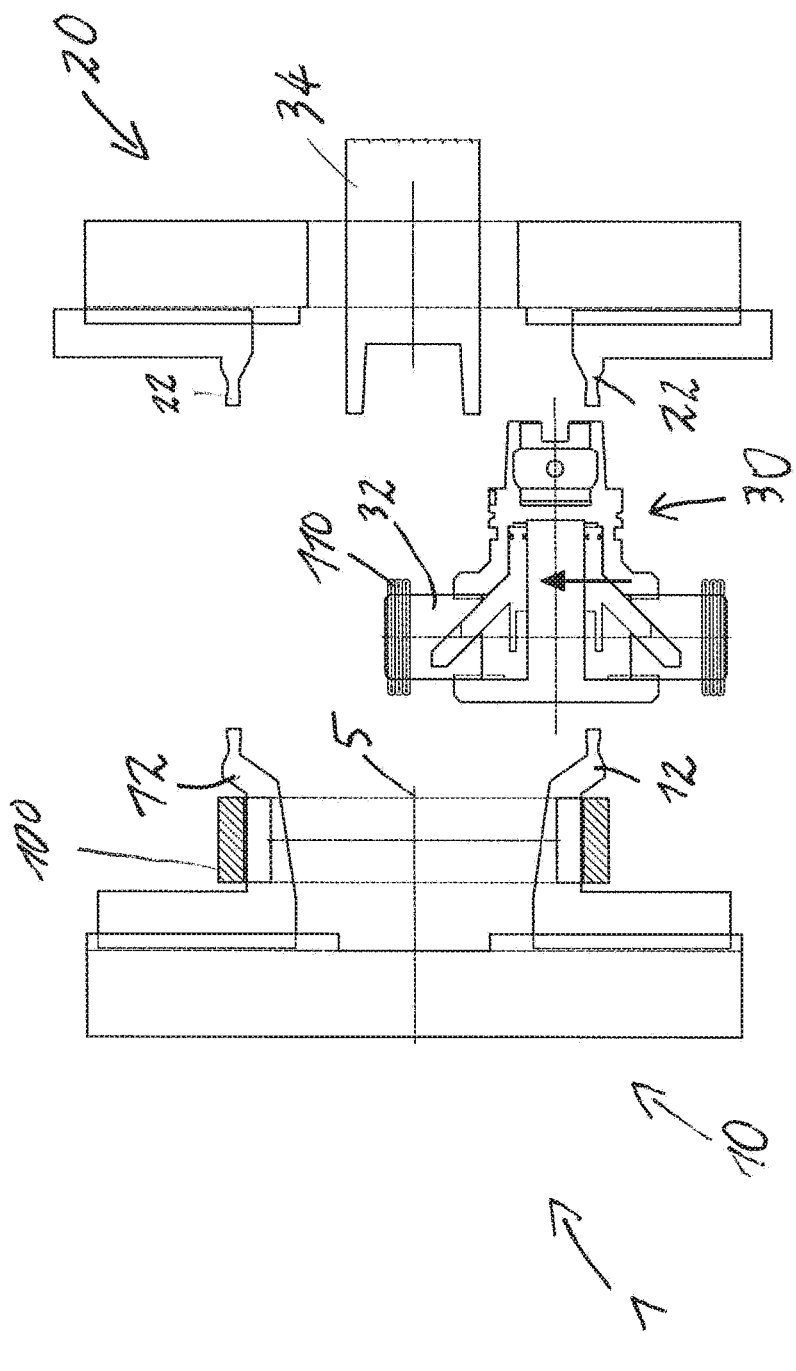
FIGS. 9 to 17 show states in a method according to a second embodiment.

FIG. 9 shows a state where the component 100 is held by the first gripping elements 12. In addition, the wires 110 are held by the guide plates 32 of the joining tool 30.

In the state of FIG. 9, the joining tool 30 is not yet aligned with the longitudinal axis 5, but is offset to it.

In the second embodiment, a centering element 34 is assigned to the joining tool 30. If the joining tool is aligned with the longitudinal axis 5, it is centered by the centering element 34 aligned with the longitudinal axis 5.

Figure 10:
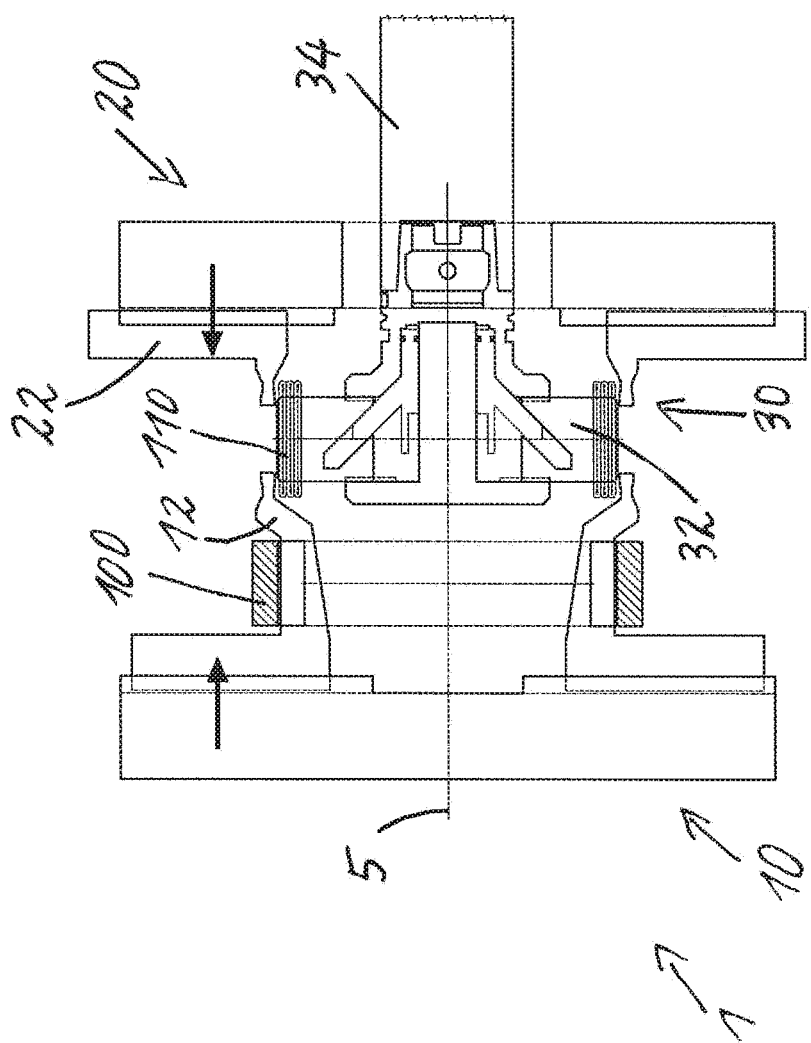
Figure 11:
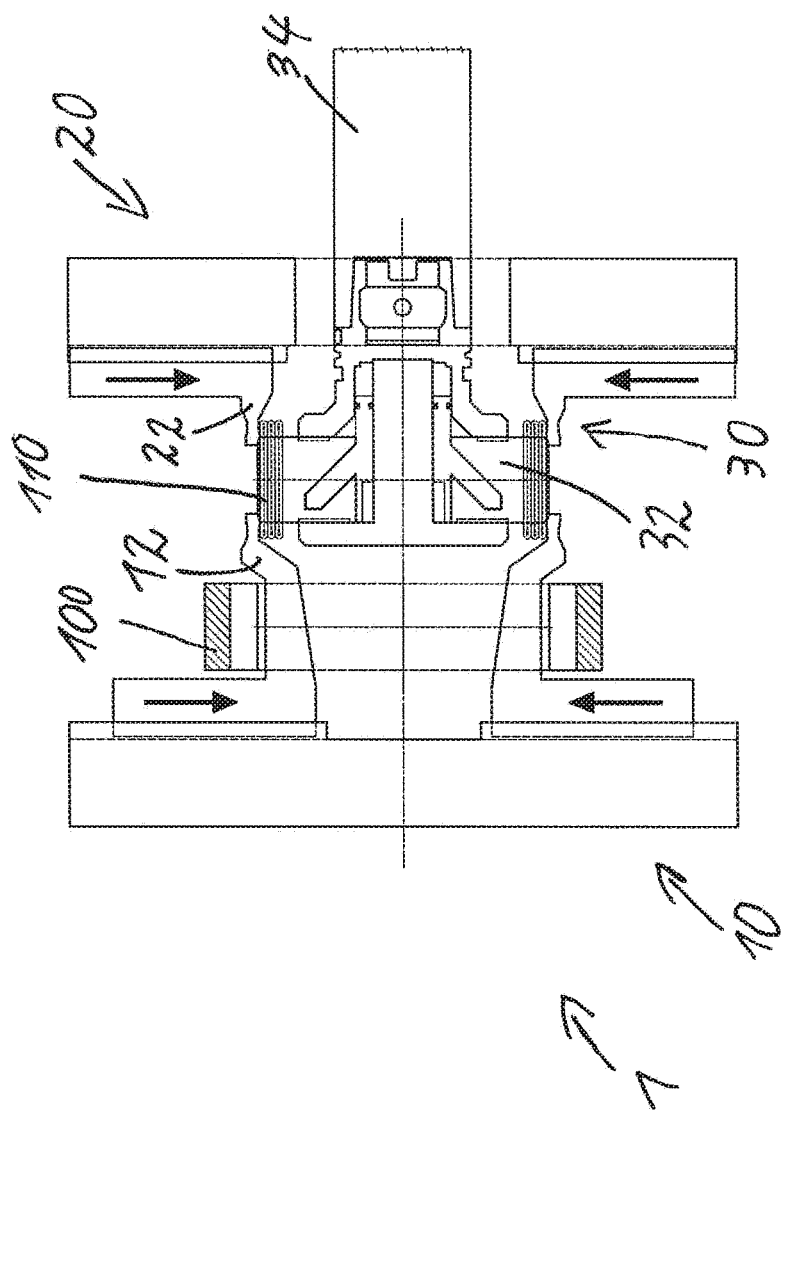
Figure 12:
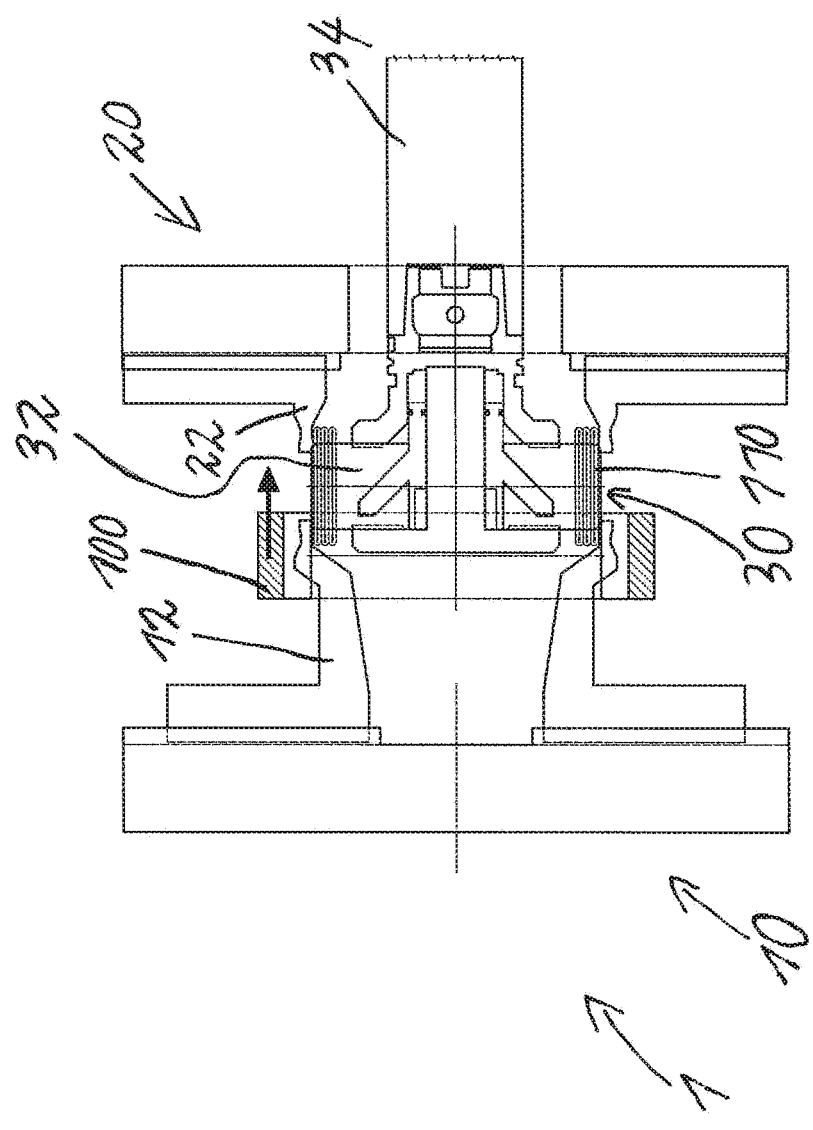

FIG. 10 shows a state where the joining tool 30 with the wires 110 applied to it is aligned with the longitudinal axis 5 and centered by the centering element 34. The gripping units 10, 20 have been axially moved so far towards each other as represented by the arrows in FIG. 10. The gripping elements 12, 22 have been extended so far radially outwards as to press on the wires 110 from radially outside.

Now the wires 110 can be compressed by means of the gripping elements 12, 22. This is represented by the arrows in FIG. 11. Thus the wires 110, which are in the form of a wire pack, are compacted.

It should be mentioned that no radial engine is used for compressing the wires 110 in the second embodiment, but the compression takes place exclusively by means of the gripping elements 12, 22.

After the compression the component 100 is displaced axially so that the component 100 is located radially outside and thus radially offset to the wires. This movement is represented by the arrow in FIG. 12.

Figure 13:
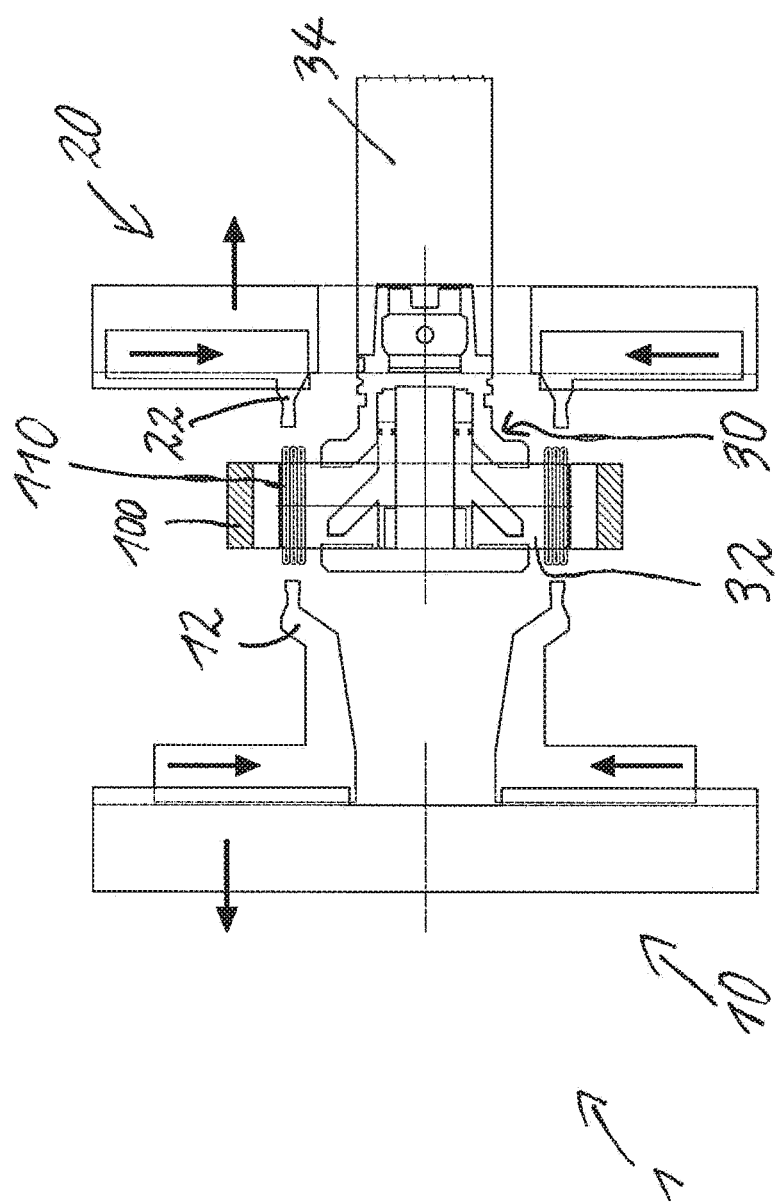

A resulting state is shown in FIG. 13 where the wires 110 are now prepared for insertion into the grooves of the component 100.

Now the gripping elements 12, 22 are axially pulled away outwards and then moved radially inwards. This is represented by the arrows in FIG. 13. In this manner the gripping elements 12, 22 can be moved radially inwards without risking damage to the wires 110.

Figure 14:
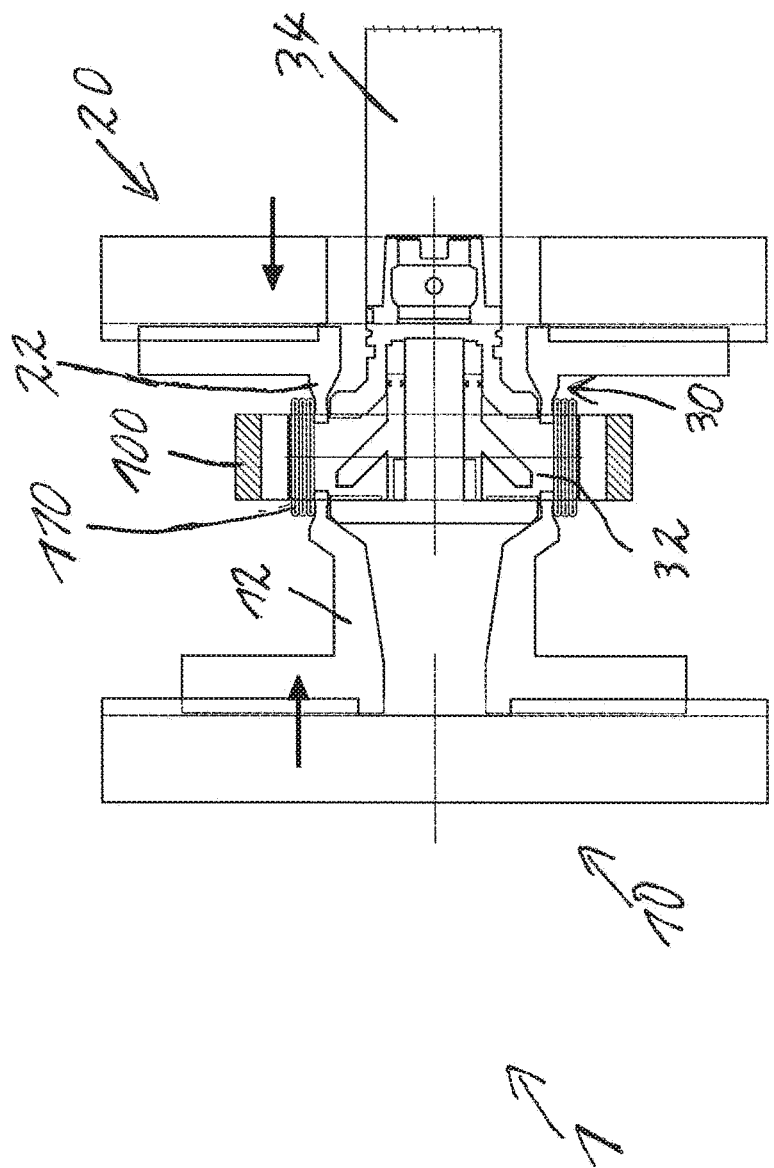

The state assumed after the described movement of the gripping elements 12, 22 is shown in FIG. 14. The wires 110 are now gripped by the gripping elements 12, 22 radially from inside.

The axial movement by means of which the gripping elements 12, 22 have been moved back towards the wires 110 is represented by the arrows in FIG. 14.

Figure 15:
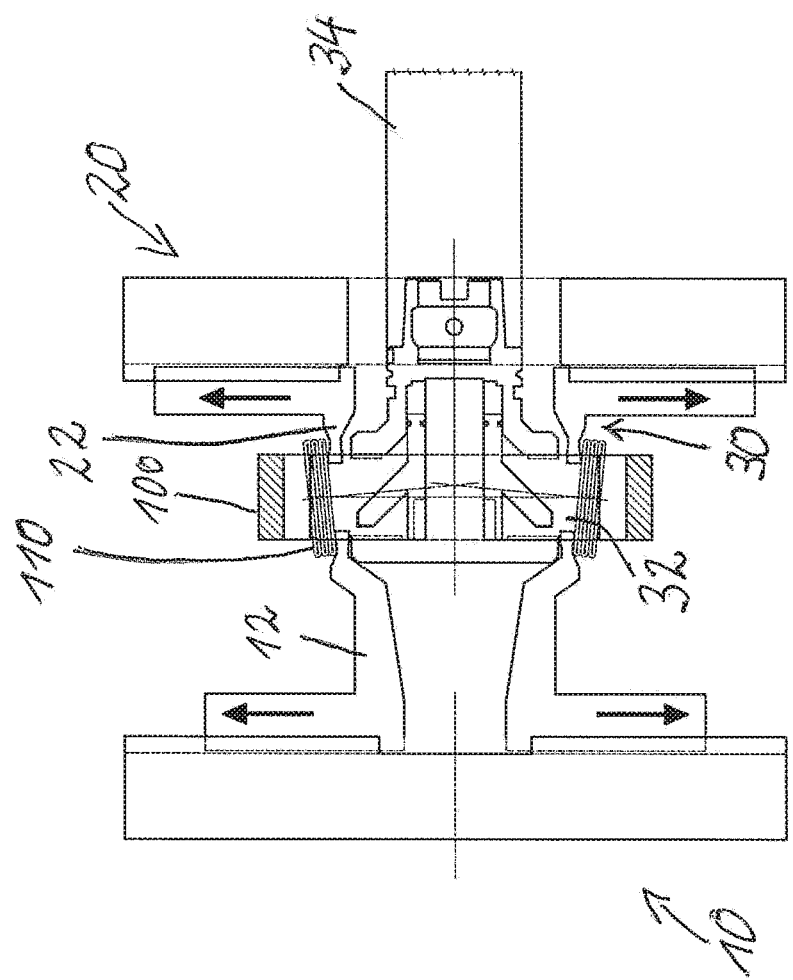

FIG. 15 shows the insertion of the wires 110 into the grooves 102 of the component 100. It can be seen that the second gripping elements 22 are radially further outward than the first gripping elements 12. This is because the movement of the second gripping elements 22 started earlier than the movement of the first gripping elements 12.

With this technique the wires 110 are inserted obliquely into the grooves 102 of the component 100. This prevents canting.

Figure 16:
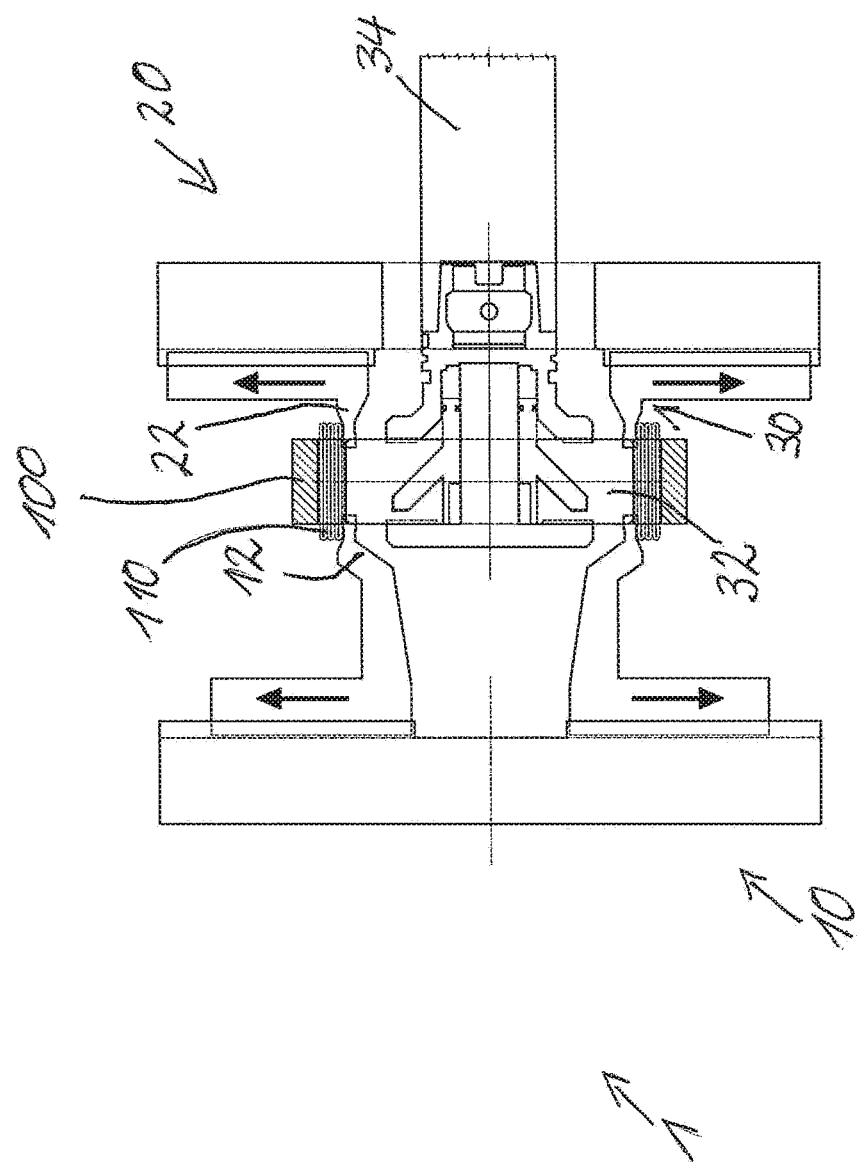

FIG. 16 shows a state where the wires 110 are fully inserted in the component 100.

The radially outward movements of the gripping elements 12, 22 for inserting the wires 110 are indicated by arrows in FIGS. 15 and 16.

Figure 17:
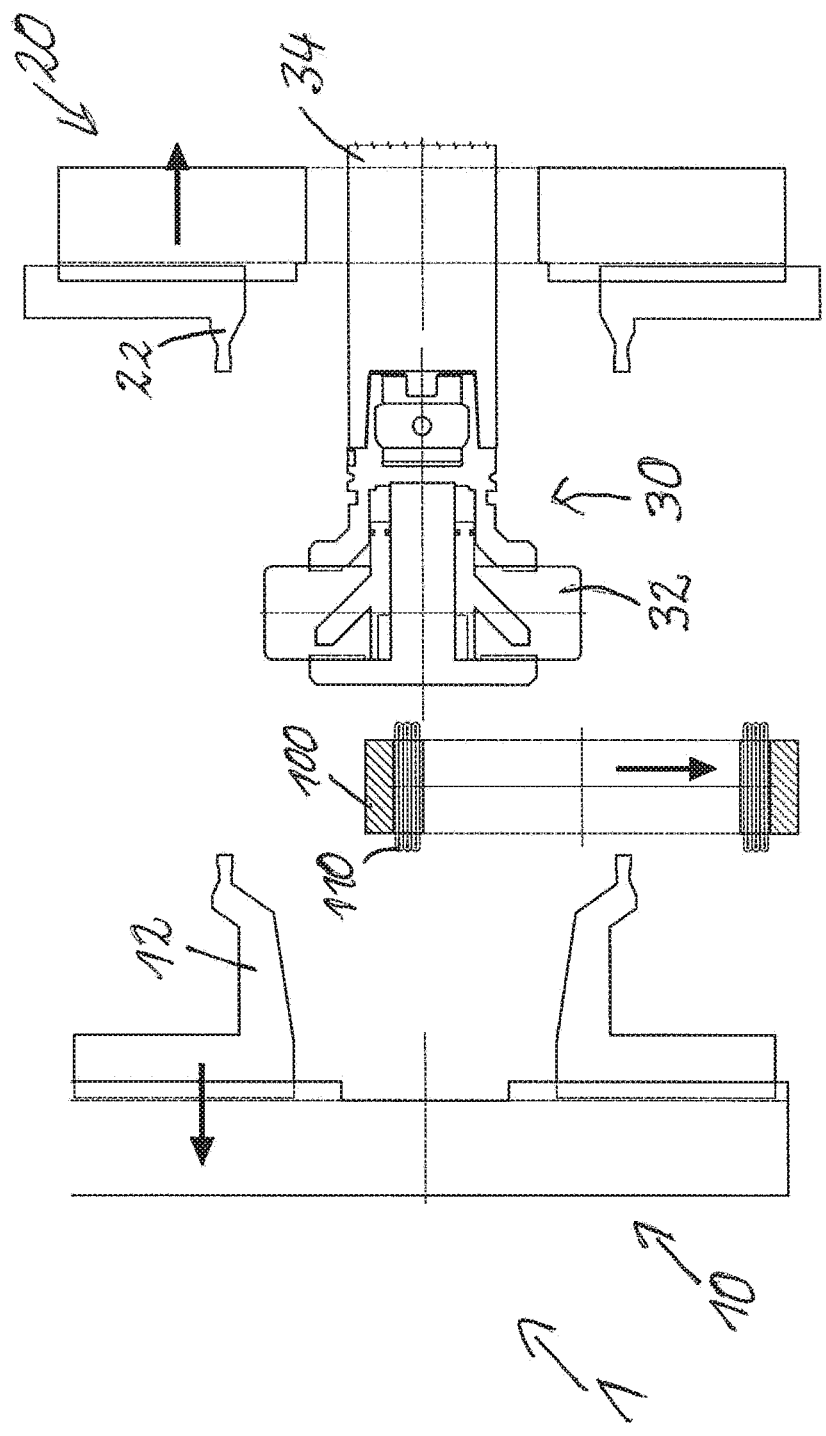

FIG. 17 shows the manner in which the components of the device 1 are moved away from the component 1 having the wires 110 inserted therein. This exposes the component 100 so that it can be used elsewhere. For example, it can be installed in an electric motor.

Possible features of the proposal are described below in structured form. The following features represented in structured form can be combined with each other as desired and can be included in any desired combination in the claims of the present application. It is clear to a person skilled in the art that the disclosure already results from the subject matter with the fewest features. In particular, the following are advantageous or possible embodiments, though not the only possible embodiments of the disclosure.

The disclosure comprises:

A method for inserting a plurality of wires into a plurality of grooves of a component, in particular a stator or a rotor, of an electric motor, the component having a longitudinal axis, the method comprising the following steps:

providing the wires radially offset to the component so that the wires at least partially extend along the longitudinal axis, gripping the wires at their respective first axial ends by means of number of first gripping elements and at their respective second axial ends opposite said first axial ends by means of a number of second gripping elements, and radially moving the gripping elements and thereby pressing the wires into the grooves.

The above-mentioned method wherein
the wires are arranged axially offset to the component before providing them and
the component and the wires are axially displaced relative to one another so that the component and the wires are aligned with one another in order to provide them.

The above-mentioned method wherein the wires are compressed prior to providing them.

The above-mentioned method wherein the wires are compresses by means of a radial engine.

The above-mentioned method wherein the wires are compressed by means of the first gripping elements and the second gripping elements.

The above-mentioned method wherein the wires are compressed by means of a radial engine, the first gripping elements and the second gripping elements.

The above-mentioned method wherein the gripping elements grip the wires on one radial side of the wires for compression, which is opposite to the side on which the gripping elements grip the wires for pressing the wires into the grooves.

The above-mentioned method wherein the gripping elements are moved axially away from the wires between the compression and the pressing of the wires into the grooves in order to change the respective radial side.

The above-mentioned method wherein the wires are compressed radially inwards.

The above-mentioned method wherein the wires are compressed radially outwards.

The above-mentioned method wherein the wires are pressed onto or between a number of guide plates during compression.

The above-mentioned method wherein the guide plates are radially movable.

The above-mentioned method wherein the guide plates are moved away from the grooves when the wires are pressed into the grooves.

The above-mentioned method wherein the component is held by the first gripping elements, at least initially.

The above-mentioned method wherein the first gripping elements engage radially into the grooves to hold the component.

The above-mentioned method wherein the component is axially movable relative to the wires by means of the first gripping elements.

The above-mentioned method wherein the wires are inserted obliquely to the axis into the grooves.

The above-mentioned method wherein the wires are inserted obliquely to the axis into the grooves by radially moving the first gripping elements earlier and/or faster than the second gripping elements, or radially moving the second gripping elements earlier and/or faster than the first gripping elements.

The above-mentioned method wherein the gripping elements are moved radially inwards to press the wires into the grooves.

The above-mentioned method wherein the gripping elements are moved radially outwards to press the wires into the grooves.

The above-mentioned method wherein the grooves are finally closed with at least one sliding cover.

A device for inserting a plurality of wires into a plurality of grooves of a component, in particular a stator or a rotor, of an electric motor, the component having a longitudinal axis, the device comprising the following:
a number of first gripping elements for gripping the wires at their respective first axial ends and a number of second gripping elements for gripping the wires at their respective second axial ends opposite said first axial ends when the wires are provided radially offset to the component, and wherein the gripping elements are configured to move radially and thereby press the wires into the grooves.

The above-mentioned device wherein
the wires can be arranged axially offset to the component before the wires are provided, and
the component and the wires can be axially displaced relative to each other to provide the component and the wires so that the component and the wires are axially aligned with each other.

The above-mentioned device wherein the device is designed for compressing the wires before the wires are provided.

The above-mentioned device wherein the device includes a radial engine for compressing the wires.

The above-mentioned device wherein the first gripping elements and the second gripping elements are designed for compressing the wires.

The above-mentioned device wherein the device includes a radial engine for compressing the wires and wherein the first gripping elements and the second gripping elements are designed for compressing the wires.

The above-mentioned device wherein for compressing the wires, the gripping elements are designed to grip the wires on a radial side of the wires which is opposite to the side on which the gripping elements grip the wires for pressing the wires into the grooves.

The above-mentioned device wherein the gripping elements are designed to be moved axially away from the grooves between compressing and pressing the wires into the grooves to change the respective radial side.

The above-mentioned device wherein the device is designed for compressing the wires radially inwards.

The above-mentioned device wherein the device is designed for compressing the wires radially outwards.

The above-mentioned device wherein the device includes a number of guide plates, with the wires being pressed onto or between the guide plates during compression.

The above-mentioned device wherein the guide plates are radially movable.

The above-mentioned device wherein the device is designed for moving the guide plates away from the grooves when the wires are pressed into the grooves.

The above-mentioned device wherein the first gripping elements are designed for holding the component, at least initially.

The above-mentioned device wherein the first gripping elements are designed for engaging radially into the grooves to hold the component.

The above-mentioned device wherein the component is movable axially relative to the wires by means of the first gripping elements.

The above-mentioned device wherein the wires are inserted obliquely to the axis into the grooves.

The above-mentioned device wherein the wires are inserted obliquely to the axis into the grooves by radially moving the first gripping elements earlier and/or faster than the second gripping elements, or radially moving the second gripping elements earlier and/or faster than the first gripping elements.

The above-mentioned device wherein the gripping elements are moved radially inwards to press the wires into the grooves.

The above-mentioned device wherein the gripping elements are moved radially outwards to press the wires into the grooves.

The above-mentioned device wherein the device includes means for the final closing of the grooves, each with at least one sliding cover.

The above-mentioned device wherein the device is adapted to carry out a method as described above.

The claims filed now with the application and later are without prejudice to the possibility of obtaining further protection.

Should a closer examination, in particular of the state of the art, reveal that one or the other feature is favorable for the aim of the disclosure, but not of decisive importance, a formulation is of course sought at this early stage which no longer contains such a feature, in particular in the main claim. Even such a sub-combination is covered by the disclosure of this application.

It should also be noted that the designs and variations described in the various embodiments of the disclosure and shown in the Figures can be combined with one another as desired. Single or several features are interchangeable with each other as desired. These combinations of features are also covered by the disclosure.

Reference of dependent claims to other claims points out to the further development of the subject matter of the main claim by the features of the respective subclaim. However, this is not to be understood as a waiver of the attainment of an independent, objective protection for the features of the subclaims referred back to other claims.

Features which have been disclosed only in the description, or also individual features from the claims which comprise a plurality of features, may at any time be transferred to the independent claim or claims as essential for distinguishing them from the prior art, even if such features have been mentioned in connection with other features or achieve particularly favorable results in connection with other features.

The invention claimed is:

1. A method for inserting a plurality of wires into a plurality of grooves of a component of an electric motor, the component having a longitudinal axis, the method comprising the following steps of:
compressing the wires such that during compression, the wires are pressed between a number of guide plates which are radially movable;
after the compressing, providing the wires radially offset to the component so that the wires extend at least partially along the longitudinal axis;
gripping each of the wires at a respective first axial end by first gripping elements and at a respective second axial end opposite said first axial end by second gripping elements; and
radially moving the first gripping elements and the second gripping elements and thereby pressing the wires into the plurality of grooves of the component of the electric motor;
wherein the compressing includes compressing the wires by:
a radial engine including radially movable elements; and/or the first gripping elements and the second gripping elements.

2. The method according to claim 1, further comprising:
arranging the wires axially offset to the component before the providing of the wires; and
axially displacing the component and the wires relative to one another so that the component and the wires are aligned with one another in order to provide the wires during the providing.

3. The method according to claim 2, wherein the compressing includes compressing the wires radially inwards or radially outwards.

4. The method according to claim 2, the arranging further comprising:
initially holding the component by the first gripping elements.

5. The method according to claim 2, wherein
the pressing includes inserting the wires obliquely to the longitudinal axis into the plurality of grooves of the component of the electric motor.

6. The method according to claim 2, wherein
the pressing includes moving the first gripping elements and the second gripping elements radially inwards or outwards to press the wires into the plurality of grooves of the component of the electric motor.

7. The method according to claim 1, wherein
the compressing includes compressing the wires radially inwards or radially outwards.

8. The method according to claim 7, further comprising:
initially holding the component by the first gripping elements.

9. The method according to claim 7, wherein
the pressing includes inserting the wires obliquely to the longitudinal axis into the plurality of grooves of the component of the electric motor.

10. The method according to claim 1, further comprising:
initially holding the component by the first gripping elements.

11. The method according to claim 1, wherein
the pressing includes inserting the wires obliquely to the longitudinal axis into the plurality of grooves of the component of the electric motor.

12. The method according to claim 1, wherein
the pressing includes moving the first gripping elements and the second gripping elements radially inwards or outwards to press the wires into the plurality of grooves of the component of the electric motor.

* * * * *